(12) United States Patent
Gruber et al.

(10) Patent No.: US 7,048,482 B2
(45) Date of Patent: May 23, 2006

(54) BORING HEAD WITH TOOL ADVANCE INDEPENDENT OF ROTATION

(75) Inventors: Philippe Gruber, Grandvaux (CH); Renaud Viellard, Lucinges (FR)

(73) Assignee: Machines Serdi, Annecy (FR)

( * ) Notice: Subject to any disclaimer, the term of this patent is extended or adjusted under 35 U.S.C. 154(b) by 0 days.

(21) Appl. No.: 10/828,317

(22) Filed: Apr. 21, 2004

(65) Prior Publication Data

US 2005/0115726 A1  Jun. 2, 2005

Related U.S. Application Data

(63) Continuation of application No. 10/237,098, filed on Sep. 9, 2002.

(60) Provisional application No. 60/352,267, filed on Jan. 30, 2003.

(30) Foreign Application Priority Data

Nov. 26, 2001  (FR) .................................. 01.15463

(51) Int. Cl.
   *B23C 1/20*  (2006.01)
(52) U.S. Cl. ...................... 409/143; 409/200; 408/150; 408/152
(58) Field of Classification Search ................ 409/143, 409/200, 191, 219, 218, 214, 231; 408/14, 408/17, 97, 95, 241 S, 113, 98, 150, 151, 408/152; 173/140, 145, 149, 150, 159; 475/162, 475/168, 169, 170, 176, 178, 180
See application file for complete search history.

(56) References Cited

U.S. PATENT DOCUMENTS 3,526,167 A   9/1970   Escobedo

| 3,540,347 A | 11/1970 | Randall |
| 3,561,544 A | 2/1971 | Farmer |
| 3,762,272 A | 10/1973 | Escobedo |
| 4,573,840 A | 3/1986 | Skrentner |
| 4,789,278 A | 12/1988 | Dexter et al. |
| 4,836,053 A * | 6/1989 | Eastman et al. ............... 74/329 |

(Continued)

FOREIGN PATENT DOCUMENTS

DE   196 05 156 A1   9/1996

(Continued)

*Primary Examiner*—Erica Cadugan
*Assistant Examiner*—Dana Ross
(74) *Attorney, Agent, or Firm*—Oliff & Berridge, PLC

(57) ABSTRACT

The transmission of the rotational movement to the driving pinion of the carriage is provided by:
  a first gear train with a cage mounted so that it can rotate about the axial shaft and the crown wheel of which meshes with a pinion fitted onto the shaft of an electric motor carried by the body, this train carrying at least two superposed planet pinions and meshing, in the case of the upper one, with a set of teeth formed around the axial shaft and, in the case of the lower one, with an output sun gear,
  a second train, the sun gear of which is secured to the output sun gear of the first train and meshes with the upper planet pinion of at least one set of superposed planet pinions which are mounted so that they are free to rotate in a continuation of the body, the lower planet pinion meshing with a set of teeth which, formed on the driving pinion of the carriage, is distinct from the set of teeth that collaborates with the rack of this carriage,
these two sun gears having ratios which are other than 1 and inverse, while the electric motor driving the cage and the one translating the quill are powered under the control of the command and control unit.

3 Claims, 3 Drawing Sheets

U.S. PATENT DOCUMENTS

| | | | |
|---|---|---|---|
| 4,932,929 A * | 6/1990 | Capewell | 475/174 |
| 5,197,836 A | 3/1993 | Crivellin | |
| 5,328,306 A | 7/1994 | Rehm et al. | |
| 5,482,415 A | 1/1996 | Belaga et al. | |
| 5,613,809 A | 3/1997 | Harmand et al. | |
| 5,782,593 A * | 7/1998 | Klement | 409/231 |
| 6,086,293 A | 7/2000 | Harmand et al. | |
| 6,533,508 B1 | 3/2003 | Nonaka | |
| 6,872,036 B1 * | 3/2005 | Linderholm | 409/200 |

FOREIGN PATENT DOCUMENTS

WO    WO 99/52664    10/1999

* cited by examiner

BORING HEAD WITH TOOL ADVANCE INDEPENDENT OF ROTATION

This is a Continuation of application Ser. No. 10/237,098 filed Sep. 9, 2002, which claims the benefit of U.S. Provisional Application No. 60/352,267 filed Jan. 30, 2003. The entire disclosure of the prior applications is hereby incorporated by reference herein in its entirety.

BACKGROUND OF THE INVENTION

The invention relates to a boring head with the tool advance independent of the rotation and intended, more specifically, although not exclusively, for machining combustion engine valve seats.

In general, a valve seat comprises a conical bearing surface against which the valve rests and which constitutes the actual seat, and two conical clearances arranged one on the outside and one on the inside, these three conical surfaces forming different angles with respect to the longitudinal axis of the stem guide collaborating with the valve stem.

DESCRIPTION OF THE PRIOR ART

For a long time, seats have been machined using an apparatus which, manufactured by the German company Hunger, and fixed to a support connected to the structure carrying the cylinder head, comprises a rotary head with a pilot rod which fits into the stem guide, a manual means for driving the head in rotation and, in this head, an inclined grove guiding a sliding carriage carrying the cutting tool. This head also contains, between the manual rotation-drive means and a toothed sleeve collaborating with a rack of the carriage, a gear train which, as the cranking handle is turned, generates the rotary movement of the spindle, therefore the cutting movement, and also causes the tool to move radially. What this means is that the radial expansion of the tool is directly proportional to its angular displacement and therefore to the speed imparted to the spindle.

This type of boring head has been abandoned because of the lack of cutting effort provided manually which did not allow seats of increasing hardness to be machined.

Document WO99/52664 describes a head constructed according to this principle but in which the rotational and translational movements of the spindle are motorized under the control of a regulator which, on the one hand, receives machining data and, on the other hand, receives information from a depth gauge. As in the Hunger head, the cutting radius is altered in proportion to the number of revolutions of the spindle.

Such a head can machine seats of greater hardness because the tool has greater torque, but does have the same disadvantages as the manual head, namely the fact that it is impossible to control the surface finish, at least on some of the conical surfaces that make up a seat.

Specifically, and in particular, on conical surfaces with a steep slope, the tool has to move radially at a higher speed which means that the punctual cutting edge of the tool does not have time to pass again over the machined surface, and this leads to a somewhat unsatisfactory surface finish. Likewise, it is known that heads in which the cutting radius is altered in proportion to the number of revolutions of the spindle cannot produce a cylindrical bore even though such an ability would make acquiring them a more viable option.

SUMMARY OF THE INVENTION

It is the purpose of the present invention to provide a boring head with cutting advance independent of the rotation which overcomes these drawbacks and makes it possible, among other things, to obtain a constant surface finish over the entirety of the machined part, whatever the angle of slope between 0 and 90°.

Like the known boring heads, one according to the invention comprises:
- a body which can be connected to the spindle quill of a machine tool, this quill being movable longitudinally at least by electric means,
- an axial shaft capable of being connected in terms of rotation to the spindle arranged in the quill, said spindle being itself connected to an electric motor capable of driving it at a variable rotational speed under the control of a programmer or other equivalent programmable command and control unit,
- a carriage that can be moved radially by the meshing of its rack with a driving pinion arranged in the body,
- and a tool holder fixed to the free end of the carriage.

The head according to the invention is one wherein the transmission of the rotational movement to the driving pinion of the carriage is provided by two epicyclical gear trains in cascade, namely:
- a first train with a cage mounted so that it can rotate about the axial shaft and the crown wheel of which meshes with a pinion fitted onto the shaft of an electric motor carried by the body, this train carrying at least two superposed planet pinions mounted so that they are free to rotate in the cage and meshing, in the case of the upper one, with a set of teeth formed around the axial shaft and, in the case of the lower one, with an output sun gear,
- a second train, the sun gear of which is secured to the output sun gear of the first train and meshes with the upper planet pinion of at least one set of superposed planet pinions which are mounted so that they are free to rotate in a continuation of the body, the lower planet pinion meshing with a set of teeth which, formed on the driving pinion of the carriage, is distinct from the set of teeth that collaborates with the rack of this carriage, these two sun gears having ratios which are other than 1 and inverse, while the electric motor driving the cage and the one controlling the translation of the quill are powered under the control of the command and control unit.

In this head, when the motor that drives the cage is not powered, the opposing ratios of the two epicyclical trains cancel one another, which means that the drive pinion of the carriage does not command the rack and that the carriage, the tool holder and the tool are not subjected to any radial displacement. By contrast, when the drive motor is powered to rotate in one direction or the other, the drive pinion of the carriage pivots in one direction or the other, causing the carriage, the tool holder and the tool to move radially.

The interpolated combination of this tool-displacement function onto an axis U, corresponding to the radius of machining with the spindle-displacement function, along an approximately vertical axis Z, makes it possible to machine any surface of revolution about the longitudinal axis of the head and therefore about the axis of the pilot, if this head is secured to a pilot rod.

In one embodiment of the invention, the drive motor of the cage of the first epicyclical gear train is of the brushless type with built-in encoder.

This motor is therefore equipped with means making it possible, at any moment, to determine the speed and angular position of its rotor and for the control unit to adjust it to suit requirements. That allows the tool to be positioned perfectly by imparting a programmed variable speed to it, and therefore makes it possible to work with constant chips, that is to say under the best possible cutting conditions, whatever the angle formed by the machined surface with respect to the longitudinal axis of the spindle.

BRIEF DESCRIPTION OF THE DRAWINGS

The invention will be better understood with the aid of the description which follows with reference to the appended schematic drawing which, by way of example, depicts one embodiment of the boring head according to the invention.

DESCRIPTION OF THE PREFERRED EMBODIMENT

Figure 1:
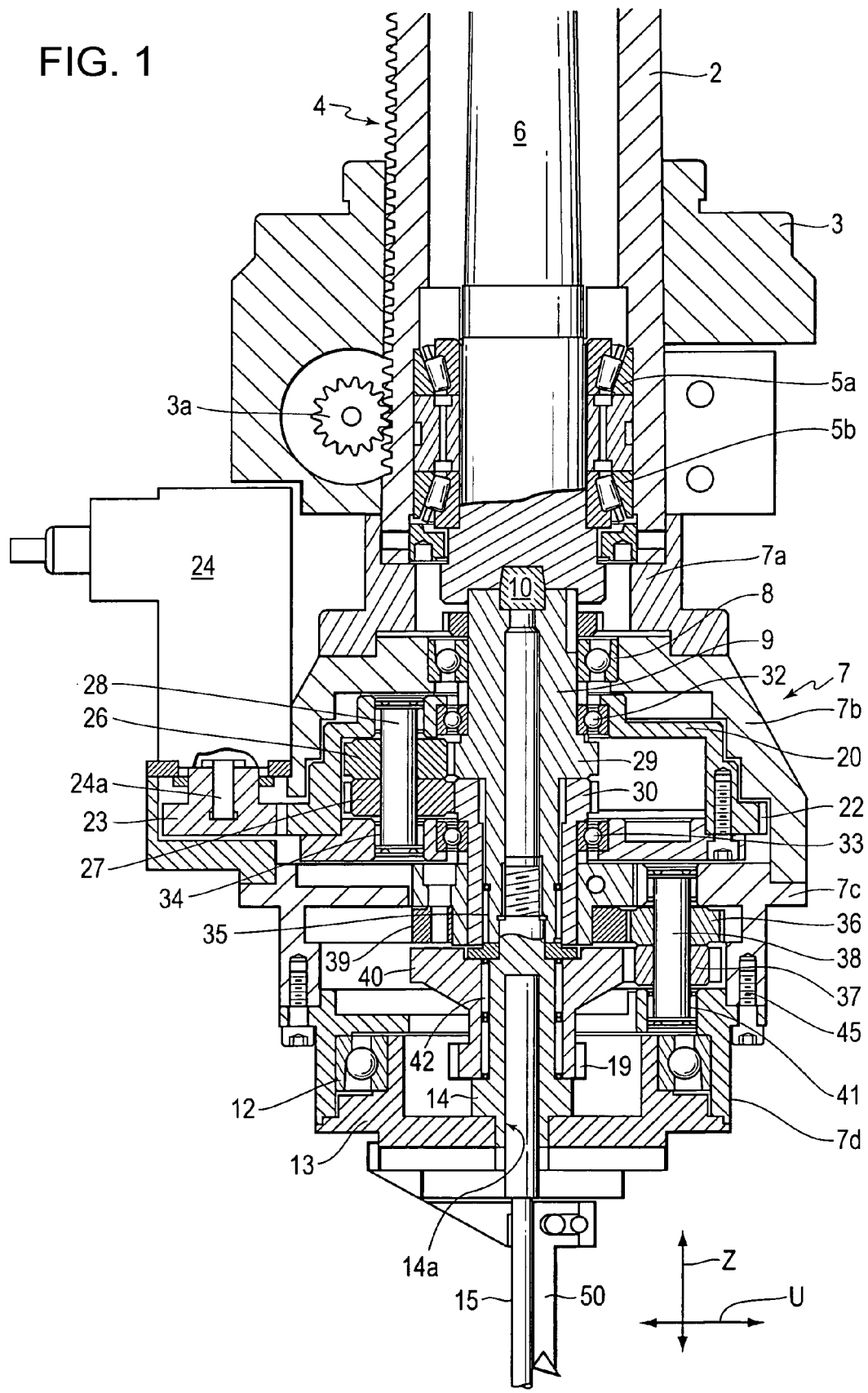
FIG. 1 is a view in longitudinal section of the head when it is mounted at the end of the quill of a machine for grinding valve seats.
Figure 3:
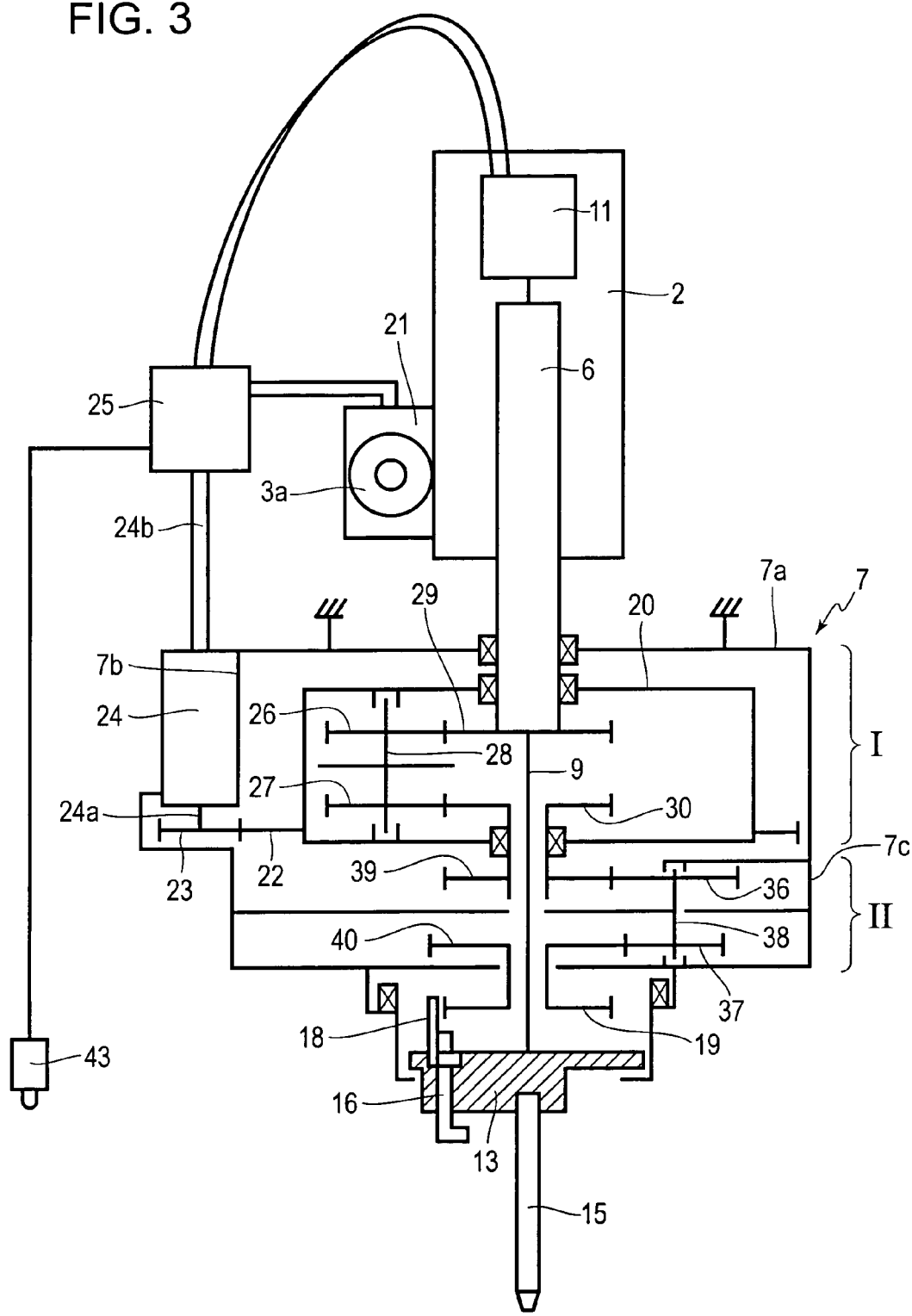
FIG. 3 is a schematic view depicting, in a simplified way, the two gear trains.

In FIG. 1, the numerical reference 2 denotes the quill of a machine tool and, in particular, of a machine for grinding valves. This quill is mounted so that it can slide in a structure 3 that allows it to be moved in a horizontal plane with respect to the structure of the machine. It may itself be moved vertically by the collaboration of a gear wheel 3a with the rack 4 with which it is equipped. The gear wheel 3a is connected in terms of rotation to a manual command, not depicted, and to an electric motor 21 (FIG. 3). This quill contains tapered roller bearings 5a, 5b which guide the rotation of a spindle 6 connected to an electric motor 11.

The head according to the invention is made up of the body 7 in several parts, of which the upper part 7a, in the form of a sleeve, is fixed to the lower end of the quill 2. A bell-shaped part 7b of the body 7 contains a roller bearing 8 guided in terms of rotation to an intermediate axial shaft 9 which is connected in terms of rotation by a transverse key 10 to the spindle 6. The body also comprises a lower part 7c, in the form of a casing, and is continued by a sleeve 7d containing a ball bearing 12 used to guide the rotation of a cover 13 connected in terms of rotation to an extension shaft 14 of the intermediate axial shaft 9. In this embodiment, the extension shaft 14 comprises a bore 14a for accommodating and positioning a pilot rod 15.

Figure 2:
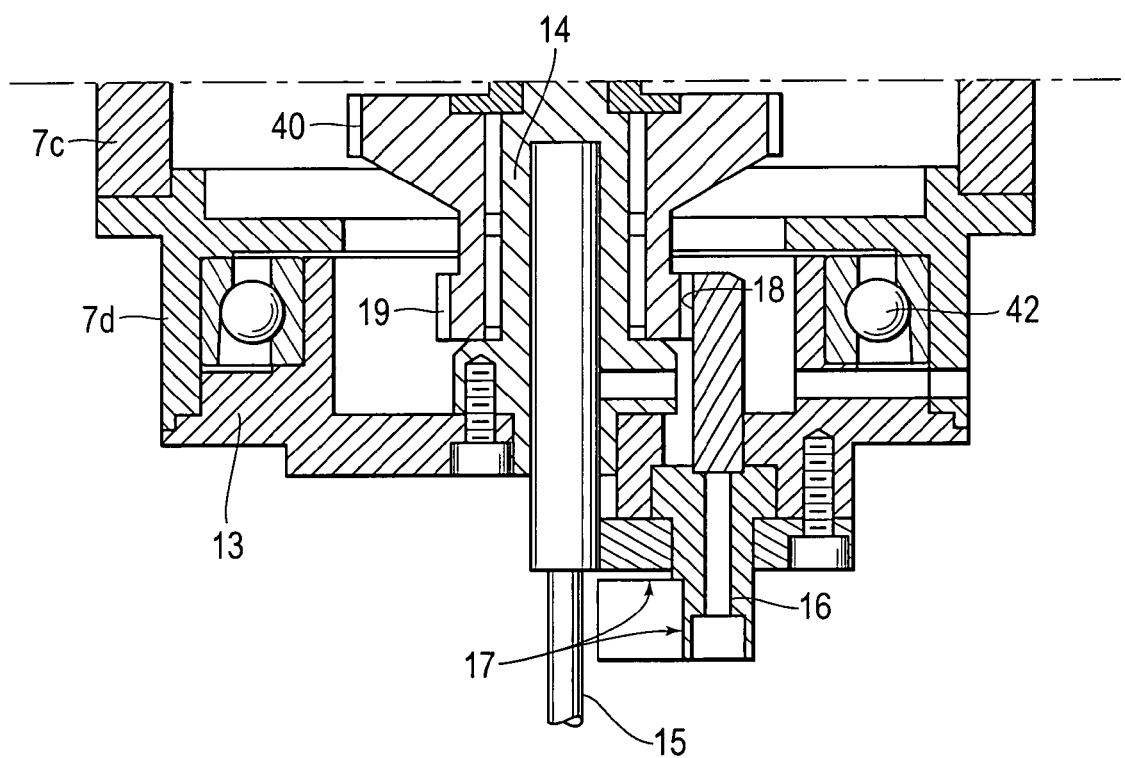
FIG. 2 is a part view, in section, of the lower part of the head, the section being made in a plane offset by 90° with respect to that of FIG. 1, to give a better view of the rack and of the carriage.

The various elements of the body 7 are connected to one another by screws, of the type depicted as 45. FIG. 2 shows that the cover 13 is designed to guide, in radial translation, a carriage 16 equipped with faces 17 for positioning and securing a tool holder 50 (FIG. 1). This carriage is also secured to a rack 18 which meshes with a drive pinion 19 which is mounted so that it can rotate freely about the extension shaft 14 of the intermediate axial shaft 9.

The rotational movement of the spindle 6 is normally transmitted to the tool via the intermediate axial shaft 9, by the extension shaft 14 and by the cover 13, while rotational movement to the drive pinion 19 causing the carriage 16 to move radially is transmitted by a mechanism which will first of all be described with reference to FIG. 3, this mechanism is made up of two epicyclical gear trains, arranged in cascade, namely a first train I and a second train II.

The train I comprises a cage 20, the crown wheel 22 of which meshes with a driving pinion 23 fitted onto the end of the shaft 24a of an electric motor 24, the body of this electric motor is fixed to the part 7b of the body of the head that is to be bored. This motor is advantageously of the brushless type, that is to say synchronous with a permanent-magnet rotor. It is equipped with a built-in encoder which is connected by circuits 24b to the command and control unit 25 also controlling the electric motor 11 which drives the rotation of the spindle 6 and the motor 21 which moves the quill 2. The cage 20 carriers at least one set of stepped planet pinions, 26 and 27 respectively, held fast in terms of rotation on a common shaft 28, the upper pinion 27 meshes with a set of teeth 29 formed at the end of the intermediate axial shaft 9, while the lower planet pinion 26 meshes with an output sun gear.

FIG. 1 shows the cage 20 guided in rotation by roller bearings 32, 33 interposed between the cage 20 and, respectively, the intermediate axial shaft 9 and an extension of the output sun gear 30, while ends of the shaft 28 carrying the two planet pinions 26 and 27 are mounted so that they are free to rotate in needle bearings 34.

Likewise, the output sun gear 30 is guided in rotation by needle bearings 35 interposed between the output sun gear 30 and the intermediate axial shaft 9.

The second gear train II (FIG. 3) comprises a fixed cage consisting of the part 7c of the body, at least one set of planet pinions 36, 37 fixed onto a common shaft 38. The upper planet pinion 36 meshes with a sun gear 39 secured in terms of translation and in terms of rotation to the output sun gear 30 of the first gear train, while the lower planet pinion 37 meshes with a sun gear 40 integral with the drive pinion 19.

FIG. 1 shows that the ends of the shaft 38 of the planet pinions are guided in rotation in needle bearings 41, while the double pinion gear 19, 40 is guided in rotation by needle bearings 42 interposed between its internal bore and the extension shaft 14. This figure also shows that, in spite of the presence of the two gear trains I and II, the head is relatively compact.

The various gear sets that make up each of the trains are calculated so that their ratio, that is to say their overall ratio, is other than 1 and more precisely so that the ratio of the second gear train is, for example, 1.008, while the ratio of the first train is inverse, and, for example, 1/1.008.

By virtue of that, when the electric motor 24 is not powered, the ratios of the two gear trains cancel one another and the drive pinion 19 rotates at the same speed as the spindle 6 and in the same direction so that it generates no relative movement of the rack 18 of the carriage 16 and of the tool holder. This, for example, makes it possible to produce a cylindrical surface.

By contrast, as soon as the motor 24 is powered, in one direction or the other, the drive pinion 19 rotates at a different speed from the spindle, leading or lagging it, and therefore causes a relative displacement of the rack with respect to the cover 13 which contains it, and therefore causes a radial movement of the tool.

Regulation, through the command and control unit 25, of the supply to the motor 24 commanding the movements of the tool along the axis U and of the supply of power to the motor 21 commanding the longitudinal displacements of the quill 2 along the axis Z, makes it possible to machine any surface of revolution about the longitudinal axis of the head.

It is emphasized that, in the known way, the starting point for the movements of the tool along the axis Z is determined:

either in terms of absolute dimensions of the machine, if the cylinder head has absolute references with respect to said machine (positioning the workpiece with reference to the camshaft bores), or in terms of relative dimensions relative to the physical position of the plane of the cylinder head gasket, in which case a feeler 43, connected to the command and control unit 25 is used. This feeler is brought into contact with the plane of the cylinder head gasket and acts as a reference relative to the axis Z of the machine.

The device, which has been described hereinabove using a pilot rod 15, can of course be used without a pilot rod, for example for producing bearing surfaces for gaskets on non-poppet-type valves or the like.

The invention claimed is:

1. A boring head with a cutting advance independent of rotation, comprising:
    a body which can be connected to a spindle quill of a machine tool, the spindle quill being movable at least by electric means;
    an intermediate shaft capable of being connected in terms of rotation to a spindle arranged in the spindle quill, the spindle being connected to an electric motor capable of driving the spindle at a variable rotational speed under control of a programmer or other equivalent programmable command and control unit;
    a carriage including a rack, the carriage capable of being moved radially by the rack meshing with a set of teeth of a driving pinion arranged in the body;
    a tool holder fixed to a free end of the carriage, the free end being opposite the rack; and
    two epicyclical gear trains, in cascade, that provide a transmission of rotational movement to the driving pinion of the carriage, the epicyclical gear trains comprising:
        a first train including a cage mounted so that the cage can rotate about the intermediate shaft, including a crown wheel that meshes with a pinion fitted onto the shaft of an electric motor carried by the body, and carrying at least two superposed planet pinions mounted so that the at least two superposed planet pinions are free to rotate in the cage, an upper one of the planet pinions meshes with a set of teeth formed around the intermediate shaft, and a lower one of the planet pinions meshes with an output sun gear;
        a second train including a sun gear secured to the output sun gear of the first train, the sun gear meshing with an upper planet pinion of at least one set of superposed planet pinions mounted so that the at least one set of superposed planet pinions are free to rotate in the body, a lower planet pinion of the at least one set of superposed planet pinions meshing with a set of teeth formed on the driving pinion of the carriage, and the set of teeth formed on the driving pinion of the carriage being distinct from the set of teeth of the driving pinion that meshes with the rack of the carriage,
    wherein, the first train and the second train include ratios which are other than 1 and an inverse, while the electric motor driving the cage and the electric means translating the quill are powered under control of the command and control unit.

2. The boring head as claimed in claim 1, wherein the ratio of the first train is 1/1.008, and the ratio of the second train is 1.0008.

3. The boring head as claimed in claim 1, wherein the electric motor driving the cage of the first train is a brushless type with a built-in encoder.

* * * * *